Dec. 15, 1936.  G. W. SEYMOUR  2,064,226
MANUFACTURE OF ORGANIC DERIVATIVES OF CELLULOSE
Filed April 10, 1934
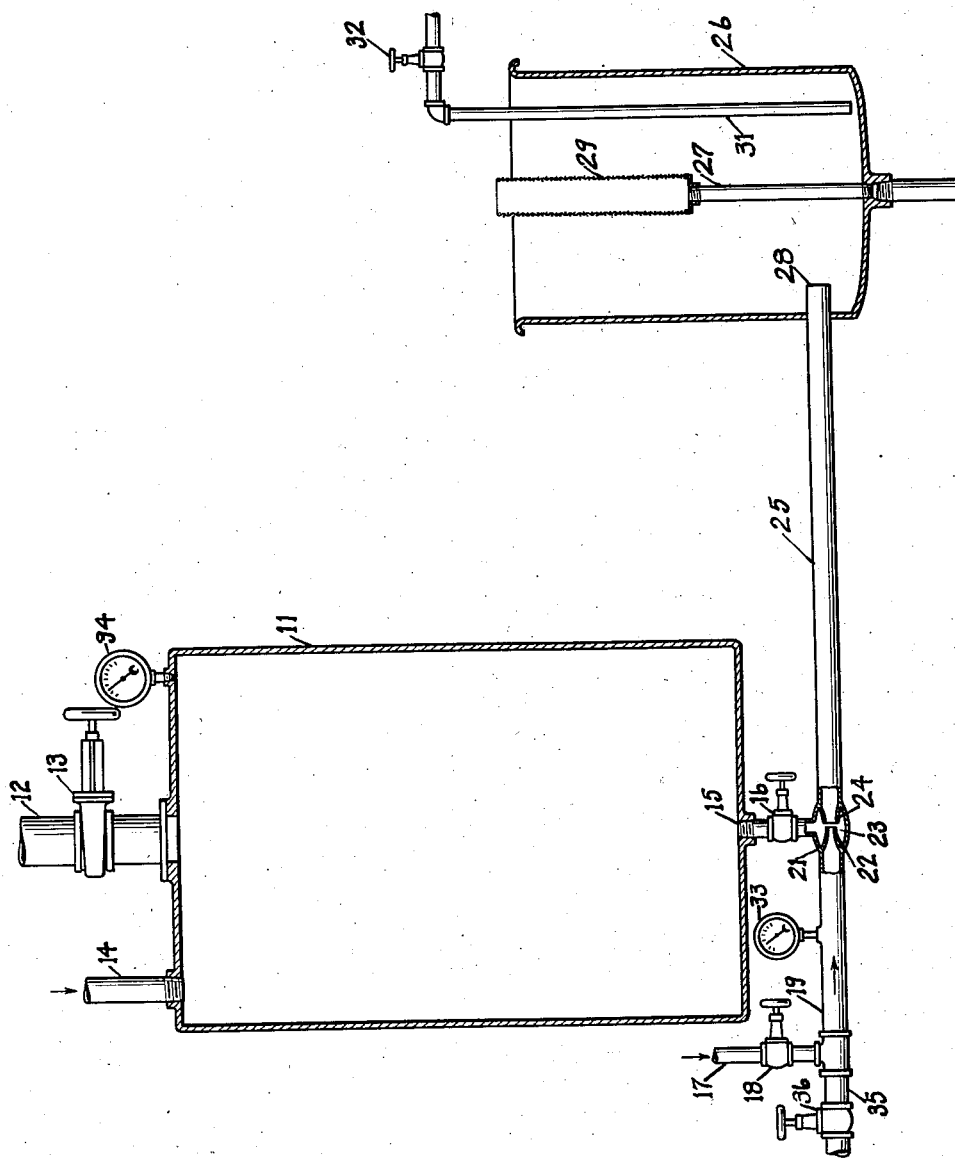
INVENTOR
GEORGE W SEYMOUR
BY
ATTORNEY Patented Dec. 15, 1936

2,064,226

UNITED STATES PATENT OFFICE 2,064,226

MANUFACTURE OF ORGANIC DERIVATIVES OF CELLULOSE

George W. Seymour, Cumberland, Md., assignor to Celanese Corporation of America, a corporation of Delaware Application April 10, 1934, Serial No. 719,821

6 Claims. (Cl. 260—102)

This invention relates to the manufacture and preparation of organic derivatives of cellulose, such as the organic esters of cellulose, in order to obtain the same in a physical condition favorable for subsequent treatments especially those treatments used in connection with the formation of films and filaments of such cellulose derivative materials. The invention also relates to the device for preparing the cellulosic material.

An object of the invention is the economic and expeditious manufacture and precipitation of organic derivatives of cellulose in a manner to derive a cellulose derivative material that may be easily and thoroughly stabilized, bleached, washed, dried, redissolved into working solutions or otherwise treated. Another object of the invention is the construction of a simple yet efficient device for precipitating cellulose derivative materials in a flocculent form. Other objects of the invention will appear from the following detailed description and drawing.

In the drawing there is shown, in side elevation and partly in section, a device constructed in accordance with my invention.

In the making of cellulose acetate by the so-called solution method, cellulose is acetylated by means of acetic anhydride and a catalyst in the presence of large amounts of acetic acid which dissolves the cellulose acetate that is formed to produce a very heavy viscous solution. This solution, usually after hydrolysis or ripening to develop the desired solubility characteristics, is then streamed or poured into water which dilutes the acetic acid to such an extent that it is no longer capable of holding the cellulose acetate in solution, with the result that the cellulose acetate precipitates. However, since the solution of cellulose acetate is very viscous, the water acts on the particles or streams thereof to precipitate the outer layers of the same to produce a sort of case-hardening effect, with the result that often the acid used as catalyst or as reagent becomes trapped within the particles and cannot be thoroughly removed by washing. Moreover, the particles may be relatively hard or gelled and require a long period of mixing with solvents in order to form a solution.

By employing this invention, however, the cellulose acetate is caused to precipitate from solution in a very fine and fluffy physical condition. In this form it readily lends itself to purification. The material is in a fine state of subdivision and each minute particle is of such a structure that it is readily penetrated by the cleansing and purifying liquids. Thus, the material may be freed from unreacted acids and catalysts by rinsing in water. The water soluble salts formed during reaction or carried into the reaction product by the reacting compounds are readily washed from the material. The water insoluble compounds are quickly reached by chemical solvents, etc. without requiring long treatments which tend to affect the uniformity of the product.

By employing this invention, there is produced a cellulose acetate precipitate which is in such a state of subdivision that in redissolving the same all the material is instantly contacted by the solvent and, therefore, no long periods of mixing to get the solvent to all parts of the material is required.

According to this invention then, I precipitate organic derivatives of cellulose from their solution of formation or other solution by exploding a mixture of the solution and steam or gaseous fluid into a precipitating bath that may be water or other non-solvent for the cellulosic material yet one which is compatible with the solvent employed. This invention is of primary importance in precipitating organic esters of cellulose from their solution of formation. It is also of importance, however, in precipitating organic esters and ethers of cellulose from any solution from which it is desired to obtain the solid material in a form susceptible to purification and redissolving treatments. Examples of organic esters of cellulose are cellulose acetate, cellulose formate, cellulose propionate and cellulose butyrate, while examples of the cellulose ethers are methyl cellulose, ethyl cellulose and benzyl cellulose.

The organic derivatives of cellulose may be formed from cellulose in any manner customarily employed for such purpose. For example, the organic esters of cellulose may be formed by reacting cellulose, with or without a pretreatment with fatty acids, with formic acid, acetic anhydride, propionic anhydride, butyric anhydride or the like in the presence of a catalyst and a solvent for the formed ester. Examples of catalyst that may be employed are one or a mixture of sulphuric acid, phosphoric acid, hydrochloric acid, zinc chloride, aluminum chloride, etc. As the solvent for the formed ester it is preferable to employ acetic acid, but other solvents may be employed, for example, formic acid, propionic acid, butyric acid, etc.

This invention also may be employed in precipitating cellulose derivatives from solutions other than their solutions of formation. It may be employed in precipitating cellulose derivatives from any solution in a relatively low boiling solvent. Thus, the cellulose derivative material may be precipitated from solution of many solvents customarily used in the art, for example, in one or a mixture of chloroform, acetic acid, acetone, acetone and ethyl or methyl alcohol, ethylene dichloride, ethylene dichloride and ethyl or methyl alcohol, and methyl chloride and ethyl or methyl alcohol.

The steam may be mixed with the cellulose derivative solution in any suitable manner such that a quick and thorough mixing is obtained. In the preferred method the cellulose derivative solution is atomized with steam, that is, the solution is broken into exceedingly fine particles or droplets by use of an atomizer or spray jet. The steam employed is preferably dry steam and may be of any suitable temperature and pressure, the pressure being dependent upon the viscosity of the solution and the apparatus used while the temperature is dependent upon the boiling point of the solvent and the temperature of the precipitating liquid into which the spray or atomized solution is blown. For example, in using the device shown in the drawing for precipitating cellulose acetate from its solution, a dry steam at 125 lbs. per square inch may be employed with a balancing pressure of 10 lbs. per square inch on the solution in the receptacle.

In place of steam other vapors and gases that do not react with the cellulose derivative material or solvent at the working temperature may be employed, for example, compressed heated gases such as air, carbon dioxide, nitrogen and the like. Vapors of organic materials such as benzol, kerosene and the like may be employed provided a precipitating bath is employed that will dissolve the vapors. This usually requires also the provision of means for cooling the precipitating bath, such as a cooling coil.

Any suitable liquid may be employed as the precipitant into which the spray or atomized solution is blown which acts as a precipitant for the cellulose derivative material. Although for most purposes water is preferred, other non-solvents for the cellulose derivative material, which are compatible with the particular solvent employed, may be used, for example, benzene, carbon tetrachloride, kerosene and the like. In most operations the temperature of the precipitation bath will be maintained slightly below room temperature by continually supplying a fresh quantity of cool precipitant, or by means of cooling coils or other expedients. However, precipitating baths may be employed having temperatures above room temperature depending upon the solvent in which the cellulose derivative material is dissolved. The temperature relations should preferably be such that the solvent removal is rapid, thus causing an explosion-like removal of the same and producing from each small atomized particle or droplet a puffed or enlarged porous particle.

In the drawing there is shown a device for performing the invention wherein 11 is a receptacle for receiving by means of the conduit 12 and valve 13 a charge of cellulose derivative material in solution, either direct from the ripening plant when treating cellulose esters or from any source where cellulosic ether or ester solutions are treated to remove them from solution. The receptacle 11 is provided with means 14, consisting of a feed line connected to a source of compressed air or other non reactive gas, for maintaining a pressure upon the charge to force it through the discharge opening 15. The discharge opening leads to a feed line that has a suitable flow control valve 16 for controlling the rate of flow of the cellulose derivative solution.

A steam line 17, connected to a suitable source of steam under pressure and controlled by the valve 18, leads to a nozzle intake pipe 19. The nozzle intake line 19 and the receptacle 11 are both equipped with pressure gauges 33 and 34, respectively, such that a desired balance of pressure may be maintained on two sides of the ejector nozzle 21 that is connected to the nozzle intake line and to the receptacle discharge line. The ejector nozzle 21 may consist of a steam ejector orifice 22 adapted to direct steam across a gap in a mixing chamber 23 and out through a discharge orifice 24 into the enlarged connecting line 25. The connecting line 25 is adapted to convey the cellulose derivative material atomized with steam at the ejector nozzle to a receiver 26. The receiver 26 may consist of a tank adapted to be partially filled with a liquid that is not a solvent for the cellulose derivative material, which receiver is provided with a drain 27 for withdrawing liquid from the receiver and a source of supply for renewing the liquid.

The drain 27 consists of a pipe running from a discharge opening in the bottom of the receiver 26 to a point above the entrance 28 of the connecting line 25. Mounted on the pipe 27 is a wire gauze cylindrical filter 29 for permitting a withdrawal of the liquid in the container without the precipitated cellulose derivative material. A liquid feed line 31 controlled by valve 32 is provided for the purpose of continually or intermittently supplying a fresh non-solvent liquid to the receiver.

For the purpose of cleaning out the nozzle and connecting line, as well as to provide means of introducing, with the steam, other gas, vapor or liquid, there is provided in the line 19 an extension line 35 controlled by valve 36.

In operation, the steam is allowed to pass through the ejector nozzle until the same is thoroughly warmed to a temperature approximately that of the steam. This means of heating the nozzle and discharge line may be replaced or aided by enclosing the same in a heated jacket that may be heated by steam, liquids, electric resistance coils, open flames or other suitable means. The solution of cellulose derivative material is then forced, by pressure from line 14 and by gravity, to flow into the mixing chamber 23 where it is caught up and dispersed, as in an atomizer, into minute particles or droplets and conveyed to the receiver 26. By controlling the pressure of steam and/or the rate of flow of the solution into the ejector nozzle, the particle size of the resulting product may be controlled. For example, by maintaining a constant steam pressure but varying the flow of solution one may obtain an extremely fine size particle precipitation. Thus, by reducing the rate of flow of the solution, a finely atomized solution is blown into the precipitating bath, or larger fluffy particles may be produced by increasing the rate of flow of the solution into the ejector nozzle. In the latter case small droplets, in distinction to the commonly called atomized form, are formed and are blown into the precipitating bath. Obviously any intermediate size of resulting product may be obtained by employing intermediate rates of flow of the solution into the nozzle.

The small particles or droplets of cellulose derivative material, heated and dispersed by the steam, are blown into the non-solvent precipitating and solvent removal bath wherein there is a rapid release of the contained solvent by the particles. The rapid release of the solvent acts to puff or "explode" each individual particle making a product that is light in weight, fluffy and porous. The precipitated material may be removed from the receiver 26 as it is formed and the precipitating liquid which may be a solvent for the solvent for the cellulose derivative material is maintained in a sufficiently pure concentration by continually adding fresh precipitating liquid and withdrawing the contaminated liquid.

The precipitated material, after being removed from the receiver 26, may be washed free of any solvent retained therein, steam or chemically stabilized and further treated and/or redissolved into working solutions from which plastics, films, lacquer bases and filaments may be formed. The cellulose derivative material may be mixed with plasticizers and effect materials to form products that are stable, extremely unaffected by light and heat and except for the effect materials are colorless or water-white in solution.

In order further to illustrate my invention, but without being limited thereto, the following specific example is given.

*Example*

A solution of cellulose acetate, which is formed by reacting cellulose with acetic anhydride in the presence of sulfuric acid as catalyst and acetic acid as solvent diluent, has water added thereto and is ripened or hydrolyzed until the cellulose acetate is soluble in acetone.

The resulting solution may comprise, for instance, 500 parts by weight of cellulose acetate, 1600 parts by weight of acetic acid of about 93% concentration, and is in the form of a heavy, viscous, syrupy solution. An aqueous solution of sodium acetate or sodium carbonate may be thoroughly mixed into the solution to "kill" the catalyst.

This solution may then be placed in a device as shown in the drawing and allowed to flow from the receptacle into the ejector nozzle at the rate of between 10 to 70 gallons per hour. The atomizing vapor may be dry steam at 125 lbs. per square inch and the precipitating bath may be water at 30° C.

For the purpose of preventing contamination of the product with difficultly removable metallic compounds, all parts of the device contacted by the cellulosic material and its solution may be formed of stainless steel or plated with chromium or coated with a protective insoluble coating material.

It is to be understood that the foregoing detailed description and drawing are merely given by way of illustration and many alterations may be made therein, without departing from the spirit of my invention.

Having described my invention, what I desire to secure by Letters Patent is:

1. Method of preparing organic acid esters of cellulose, which comprises atomizing a solution of an organic acid ester of cellulose in a volatile solvent by means of steam and then subjecting such atomized solution to the action of a liquid precipitant for the organic acid ester of cellulose.

2. Method of preparing cellulose acetate, which comprises atomizing a solution of cellulose acetate in a volatile solvent by means of steam and then subjecting such atomized solution to the action of a liquid precipitant for the cellulose acetate.

3. Method of preparing organic acid esters of cellulose which comprises spraying a mixture of a solution of same and substantially dry steam into a cool aqueous bath.

4. Method of preparing cellulose acetate which comprises spraying a mixture of a solution of same and substantially dry steam into a cool aqueous bath.

5. Method of preparing cellulose acetate which comprises atomizing an acetic acid solution from the acetylation of same, with substantially dry steam and then ejecting the atomized material into a cool aqueous bath.

6. Method of preparing cellulose acetate which comprises finely dividing an acetic acid solution, from the acetylation and ripening of same, by substantially dry steam and then immersing the finely divided solution in cool water.

GEORGE W. SEYMOUR.